(12) United States Patent
Cheng

(10) Patent No.: US 9,898,768 B2
(45) Date of Patent: Feb. 20, 2018

(54) SYSTEM AND METHOD FOR PREVENTING, RESPONDING TO, OR DISCOURAGING PREDATORY AND UNCOMPETITIVE SALES PRACTICES

(71) Applicant: Newegg, Inc., City of Industry, CA (US)

(72) Inventor: Lee C. Cheng, City of Industry, CA (US)

(73) Assignee: NEWEGG, INC., City of Industry, CA (US)

( * ) Notice: Subject to any disclaimer, the term of this patent is extended or adjusted under 35 U.S.C. 154(b) by 693 days.

(21) Appl. No.: 14/154,681

(22) Filed: Jan. 14, 2014

(65) Prior Publication Data

US 2014/0201032 A1  Jul. 17, 2014

Related U.S. Application Data

(60) Provisional application No. 61/752,152, filed on Jan. 14, 2013.

(51) Int. Cl.
*G06Q 30/06* (2012.01)

(52) U.S. Cl.
CPC .............................. *G06Q 30/0609* (2013.01)

(58) Field of Classification Search
None
See application file for complete search history.

(56) References Cited

U.S. PATENT DOCUMENTS

2006/0095281 A1* 5/2006 Chickering ............ G06Q 30/02
705/37

* cited by examiner

*Primary Examiner* — Shay S Glass
(74) *Attorney, Agent, or Firm* — The Webb Law Firm

(57) ABSTRACT

A method and system for identifying and discouraging predatory and uncompetitive sales practices includes identifying at least one base cost for at least one product, determining at least one current cost for the at least one product from at least one retailer displaying or selling products and services through online or mobile channels, and determining if the at least one product sold by the at least one retailer displaying or selling products and services through online or mobile channels is a loss-leader based at least partially on the at least one base cost and the at least one current cost. At least one of the at least one product may be automatically purchased from the at least one retailer displaying or selling products and services through online or mobile channels if the at least one product sold by the at least one retailer is determined to be a loss-leader. A system for implementing the aforementioned method includes appropriately communicatively connected hardware components.

30 Claims, 3 Drawing Sheets

SYSTEM AND METHOD FOR PREVENTING, RESPONDING TO, OR DISCOURAGING PREDATORY AND UNCOMPETITIVE SALES PRACTICES

BACKGROUND OF THE INVENTION

Field of the Invention

The present invention relates to predatory and uncompetitive sales practices and, more specifically, a method and system for identifying, preventing, responding to, and/or discouraging predatory and uncompetitive sales practices.

Background Information

Many retailers use predatory and uncompetitive sales practices to increase their respective market shares. A good or service offered for sale by a retailer for a price less than the retailer's cost of providing said good or service is commonly called a "loss-leader" and is referred to as such herein. Retailers often attempt to attract new customers by marketing loss-leaders, hoping that customers will buy other products that are not discounted in addition to the loss leader. However, predatory and uncompetitive sales practices can also be used by well-funded retailers to drive competitors out of business.

Accordingly, many states have enacted laws to restrict such anti-competitive practices. However, it is often difficult to make out a cause of action under such laws, as many of them require that a potential plaintiff prove that the retailer had the specific intent to injure a competitor's business or to mislead customers. Furthermore, many of these laws do not account for overhead costs that would be common to all retailers and therefore allow for at least some level of anti-competitive behavior.

Additionally, the practice of loss-leading has expanded to retailers selling products and services through online or mobile sales channels, creating further obstacles to legally preventing this type of anti-competitive behavior. For example, jurisdictional barriers often prevent enforcement in the increasingly global online retail market. Accordingly, there is a recognized need for a method and system for discouraging predatory and uncompetitive sales practices that does not require government intervention.

SUMMARY OF THE INVENTION

It is therefore the object of the present invention to discourage the practice of loss-leading by identifying retailers using an online or mobile sales channels that are engaging in such practices, and buying loss-leading goods in quantities sufficient to ensure that loss-leading is not profitable. It is a further objective of the invention to obtain an inventory of goods at the best price possible by taking advantage of predatory and uncompetitive deals offered by competitors.

According to one preferred and non-limiting embodiment of the present invention, provided is a method of preventing and responding to loss-leading practices, the method performed on at least one computing device including at least one processor, the method comprising the steps of: identifying at least one base cost for at least one product; determining at least one current cost for the at least one product from at least one retailer using an online or mobile sales channel; determining if the at least one product sold by the at least one retailer is a loss-leader based at least partially on the at least one base cost and the at least one current cost; and automatically purchasing at least one of the at least one product from the at least one retailer if the at least one product sold by the at least one retailer is determined to be a loss-leader.

According to another preferred and non-limiting embodiment of the present invention, provided is a system for preventing and responding to loss-leading practices, including at least one database comprising at least one base cost for at least one product; and at least one computer including at least one processor, the at least one computer configured to: determine at least one current cost for the at least one product from at least one retailer using an online or mobile sales channel; determine if the at least one product sold by the at least one retailer is a loss-leader based at least partially on the at least one base cost and the at least one current cost; and automatically purchase at least one of the at least one product from the at least one retailer if the at least one product sold by the at least one retailer is determined to be a loss-leader.

In some non-limiting embodiments, the at least one base cost for the at least one product is calculated at least partially based on a purchase price of the at least one product. Further, the at least one current cost for the at least one product may be determined based at least partially on at least one of the following: online or mobile advertisements for the at least one retailer, third-party coupons, third-party websites, third-party rebates, coupons offered by the at least one retailer, discounts offered by the at least one retailer, rebates offered by the at least one retailer, gift card giveaways, or any combination thereof. In some examples, the determination if the at least one product sold by the at least one retailer is a loss-leader may be based at least partially on at least one buffer amount, wherein the at least one product sold by the at least one retailer is a loss-leader if the at least one current cost plus the at least one buffer amount is less than the at least one base cost. Additionally, the at least one buffer amount may include the sum of at least two of the following: cost of shipping, cost of receiving, cost of storing, cost of offering the product for sale, or any combination thereof. Moreover, in embodiments, the at least one base cost may be retrieved from at least one database.

In some non-limiting embodiments, the step of automatically purchasing the at least one product from the at least one retailer may include the step of automatically filling-in at least one form on a website of the at least one retailer with electronic payment information and shipping information. The shipping information, in one example, may include a physical address chosen from a plurality of physical shipping addresses. Further, multiple orders may be placed for the at least one product, and an Internet protocol (IP) address used to access the website may be modified at least once. In one embodiment of this example, the IP address may be modified by "spoofing" the IP address. Further, it will be appreciated that the shipping information may include at least one virtual address and/or an address selected from a plurality of shipping addresses representing a single receiving location.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
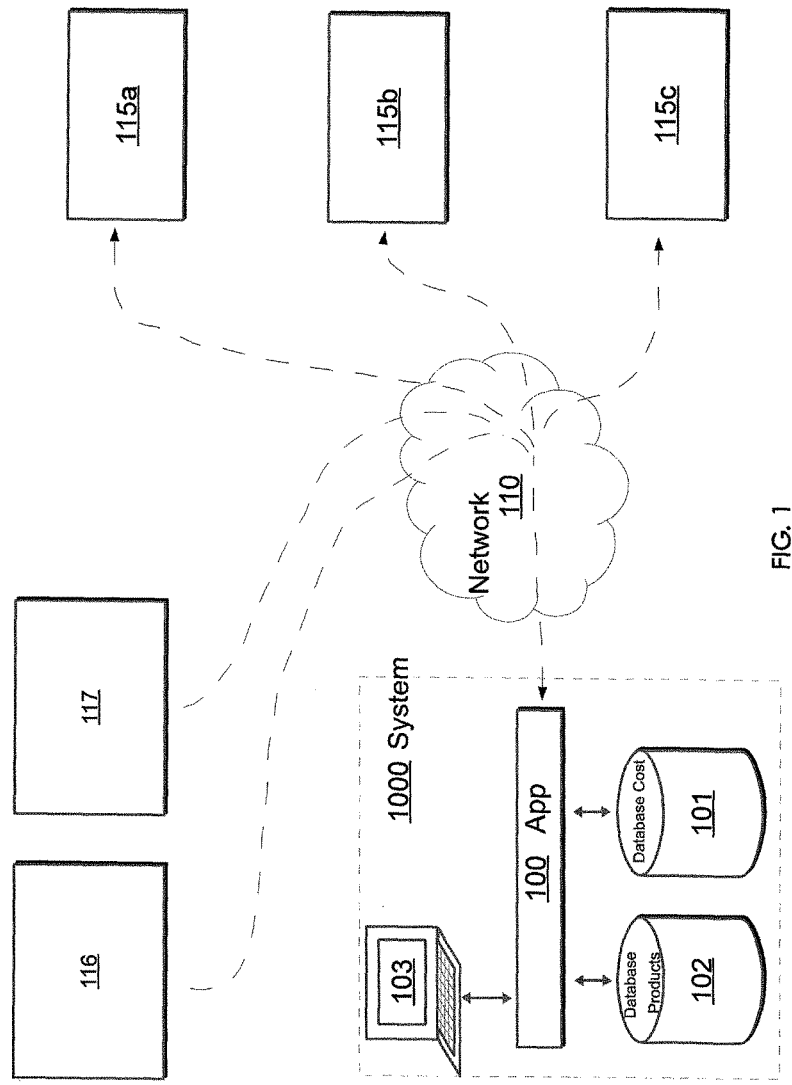
FIG. 1. depicts an embodiment of the disclosed system for discouraging predatory and uncompetitive sales practices according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt or transfer of one or more signals, messages, commands, or other types of data. For one unit or component to be in communication with another unit or component means that the one unit or component is able to receive data from and/or transmit data to the other unit or component. This can refer to a direct or indirect connection that may be wired and/or wireless in nature. Additionally, two units or components may be in communication with each other even though the data transmitted may be modified, processed, routed, etc., between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

Referring now to FIG. 1, a loss-leading prevention system 1000 is shown according to one preferred and non-limiting embodiment. The system 1000 is designed to discourage, prevent, and respond to loss-leading practices, primarily among retailers using online or mobile sales channels, who do business on the World Wide Web or through other electronic channels of commerce. As used herein, "retailer" and "retailers" refer to any entity and/or service that sells goods and/or services through the Internet, through mobile sales channels, or through any other electronic means. The system 1000 may include one or more databases 102, 101, a loss-leading application 100, and a computing device 103. A cost database 101 may include the base costs for one or more products. A products database 102 may include one or more products that a user offers for sale, desires to offer for sale, or is otherwise interested in targeting, as well as any current inventory of the user for the one or more products. The loss-leading application 100 may include one or more software and/or hardware modules that are configured to be executed or otherwise run on the computing device 103. Moreover, the loss-leading application 100 may be in communication with the databases 101, 102. It will be appreciated that the databases 101, 102 may also be in the form of a single database, and may include one or more data structures of any type.

With continued reference to FIG. 1, the loss-leading prevention system 1000 is in communication with a network environment 110, such as the Internet. Through the network environment 110, the loss-leading prevention system 1000 may be in communication with one or more third-party advertisement resources 116, discount websites and/or databases 117, and various retailers using online or mobile sales channels 115a, 115b, 115c. In one example, discount websites 117 may include various forums and resources that include aggregated sales/discount information. This information may be parsed and processed to extract various deals, sales, promotions, and the like. It will be appreciated that the system 1000 may also be in communication with any of the third-party resources, websites, databases, etc., directly or indirectly, or through other network environments.

In an embodiment, a base cost represents the cost for a retailer to acquire and sell a product. The base cost may include a buffer cost which represents the estimated additional costs that a retailer may incur in acquiring and offering a product for sale in addition to the purchase price and/or wholesale price of the product. A buffer cost may include, for example, the cost of shipping, receiving, and/or storing the product, in addition to the cost of offering the product for sale. The buffer cost may be calculated at any time or may simply be incorporated into the base cost of the product.

In the embodiment shown in FIG. 1, the computing device 103 may be configured to communicate with the cost database 101 and/or the products database 102. The loss-leading application 100 may be configured to identify any retailers 115a, 115b, 115c that are selling any products listed in the products database 102 at a sale (e.g., retail) price that is less than the base cost for the respective product, or is less than the base cost plus the buffer cost for the respective product. The application 100 may be further configured to automatically place orders for the products, or to compile a list of such products and provide the user with the option to purchase the products or to perform other actions in relation to the products.

Many retailers using online or mobile sales channels attempt to prevent customers from purchasing products in large quantities by restricting the quantity that may be purchased by a single Internet protocol (IP) address, or the frequency that such purchases are made. Moreover, it is appreciated that repeated usage of the system 1000 may cause one or more retailers to attempt to block or otherwise prevent the system 1000 from interacting with its website. Accordingly, in one preferred and non-limiting embodiment, a method for modifying and/or updating an IP address of the computing device 103 is provided. For example, the application 110 may use a list of internal or otherwise available IP addresses to choose varying IP addresses for each purchase. In another example, one or more proxies may be used to obscure the originating IP address of the system 1000. In an embodiment, the IP address of the system 1000 and/or computing device 103 may be "spoofed" with one or more IP spoofing methods known by one having ordinary skill in the art. Various other methods may be used to generate and use many IP addresses.

In another preferred and non-limiting embodiment, a time between purchases of a particular product or from a particular IP address may be varied. A random number generator may be used to randomly vary a time interval between purchases and, in some instances, randomly vary a time interval between new IP addresses as discussed above. For example, the system 1000 may interact with and purchase product from a retailer using an online or mobile sales channel at random intervals and from multiple IP addresses, making it difficult for the retailer to prevent such practices. It will be appreciated that various other techniques may be implemented to create the appearance that a human, rather than an automated application or bot, is making the purchases. For example, known methods may be used to circumvent human-verification requests. Further, the application 100 may communicate with and/or manipulate keyboard and/or mouse controls of the computing device 103 and varying layers of the computer and/or operating system architecture.

Further, a retailer may attempt to prevent customers from purchasing products in large quantities by restricting the number of products that may shipped to a single physical address. Additionally, a retailer may also have an ability to "blacklist" certain physical addresses, preventing their systems from accepting orders from such addresses. Accordingly, in one preferred and non-limiting embodiment, the purchase of the products may involve the use of various physical shipping addresses. In one example, a shipping address may be selected from a database of addresses and, after a particular shipping address is used, the database may be updated to indicate that the particular address was used in connection with a particular product or with a particular retailer. In a further example, multiple physical addresses may be used that are forwarded to the same physical address. It will be appreciated that various other implementations may be used to disguise an ultimate destination address, or for arranging for multiple destination addresses. This feature may serve several purposes including, for example, preventing an address from being "blacklisted" from overuse, circumventing restrictions on the quantities of a product that may be purchased from a single address, and/or the like.

Figure 2:
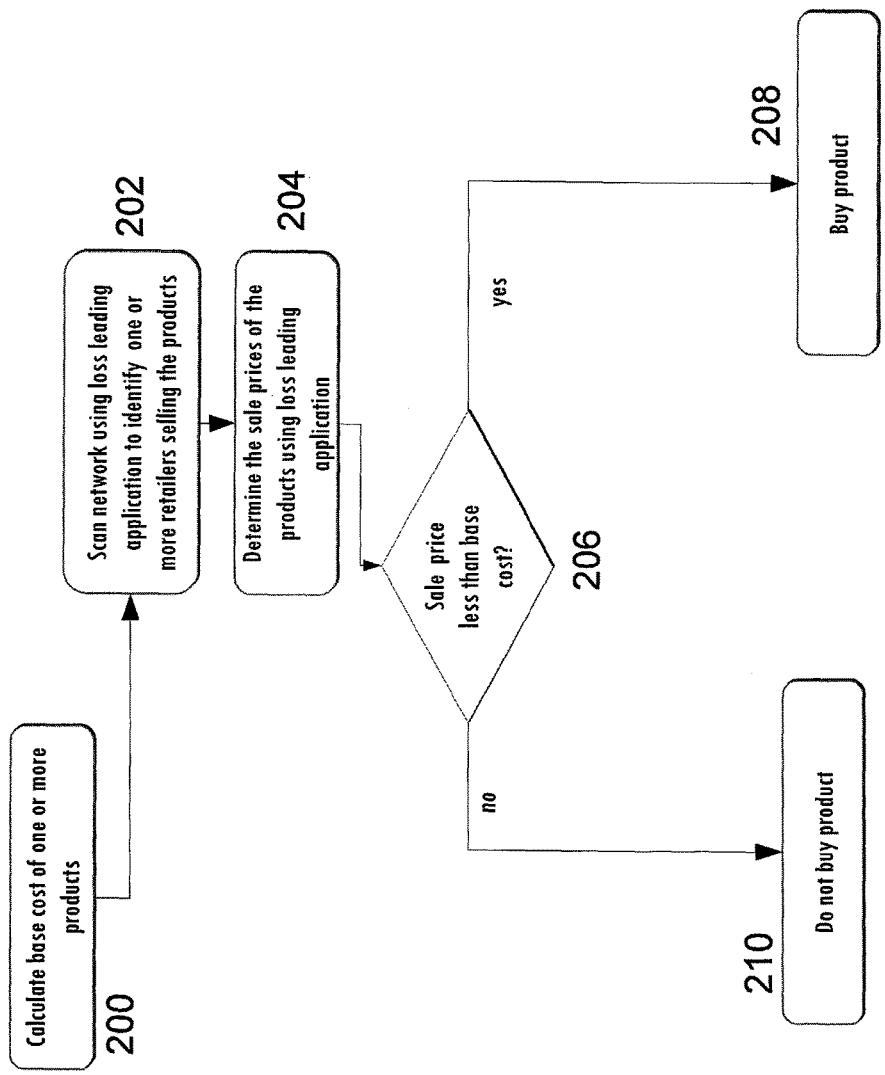
FIG. 2. depicts a flow chart for an embodiment of the disclosed method for discouraging predatory and uncompetitive sales practices according to the principles of the present invention.

Referring now to FIG. 2, a flow chart is shown for a method of discouraging loss-leading practices according to one preferred and non-limiting embodiment. In a first step 200 of the embodiment shown, a base cost is determined for one or more products. As already described, the base cost may refer to the cost of a retailer to acquire and/or maintain a product in inventory and may, in some examples, comprise the wholesale price and/or purchase price of the product plus the cost of shipping, storing, and/or offering the product for sale. In some embodiments, the base cost may include a buffer price for one or more of the identified products. As already described, the buffer price may be calculated at any time or may simply be incorporated into the base cost of the product. Further, the base cost may be manually inputted, or may be determined based on an algorithm that takes into consideration a wholesale price, an average price, a user's cost, and/or the like. In one embodiment, the base costs for several products are compiled in a database 101 that also contains a list of associated products or is in communication with a products database 102 containing a list of the products that the user offers for sale or desires to offer for sale.

In a second step 202 of the embodiment shown in FIG. 2, at least one computing device 103 is used to scan, analyze, or otherwise receive information from retailers using online or mobile sales channels 115a, 115b, 115c through a network 100. Through this process, the computing device 103 and, more specifically, the application 110, is able to identify one or more retailers using online or mobile sales channels 115a, 115b, 115c selling the products. Once the retailers 115a, 115b, 115c are identified, at a third step 204, the sales prices of the products are determined for each of the products. As already discussed, the sales prices may be calculated based on various factors such as, but not limited to, online advertisements for the at least one retailer, third-party coupons, third-party websites, third-party rebates, coupons offered by the at least one retailer, discounts offered by the at least one retailer, free giveaways, promotions, gift card giveaways, and/or rebates offered by the at least one retailer. It will be appreciated that various other factors may be used, and that various algorithms may be implemented to calculate the base cost from the factors.

With continued reference to FIG. 2, in a fourth step 206 of the embodiment shown, a determination is made whether to purchase the products identified. This determination can be as simple as comparing the sales price with the base cost, or may also factor in a buffer cost or a predefined amount or percentage that the sales price must be less than the base cost by. If, after this determination, it is decided that the product should be purchased, the method proceeds to step 208 and the loss-leading application 100 initiates the purchase methods described herein. Further, if it is decided that the product should not be purchased, the method proceeds to step 210 where it ends.

The computing device 103 and/or the loss-leading application 100 may be configured to automatically place orders for the products, or to compile a list of such products and provide the user with the option to purchase the products. In one embodiment, the products are purchased in quantities such that the user is able to acquire a substantial inventory of the products at the loss-leading price and the seller is discouraged from engaging in predatory and uncompetitive sales practices in the future. In another embodiment, a current inventory of the user for products that have been determined as a loss-leaders may be used to determine whether to purchase those products and/or quantities of those products to purchase from the seller. In still another embodiment, a report based on the determined loss-leader(s) and the corresponding seller(s) may be automatically sent to an enforcement agency responsible for ensuring anti-competitive practices. Methods for purchasing in quantities are discussed herein. In another embodiment, an alert or message may be generated and sent to a user indicating the results of the determinations and analysis. The user may then, in response to such a message or alert, verify that the products should be purchased, prevent the products from being purchased, specify a quantity to be purchased, specify a time interval over which the products should be purchased, or customize any other parameter.

Figure 3:
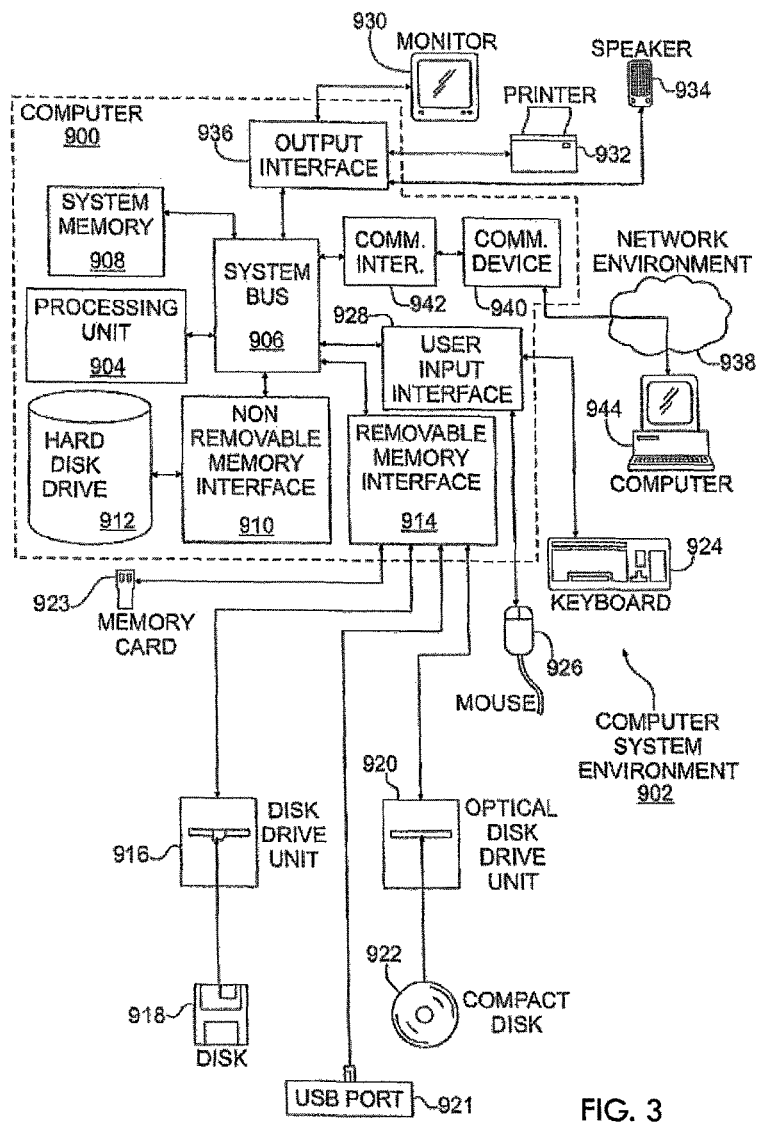
FIG. 3 is a schematic diagram of a computer and network infrastructure according to the prior art.

The present invention may be implemented on a variety of computing devices and systems, wherein these computing devices include the appropriate processing mechanisms and computer-readable media for storing and executing computer-readable instructions, such as programming instructions, code, and the like. As shown in FIG. 3, personal computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904

(typically referred to as a central processing unit or CPU) that serves to execute computer-based instructions received in the appropriate data form and format, a system bus 906, and the like. Further, this processing unit 904 may be in the form of multiple processors executing code in series, in parallel, or in any other manner for appropriate implementation of the computer-based instructions.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 3, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 3 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure or otherwise implement the methods, processes, and transformational data manipulations discussed hereinafter in connection with the present invention. Still further, the computer 900 may be in the form of a personal computer, a smartphone, a tablet computer, a personal digital assistant, a laptop, a palmtop, a mobile telephone, a server, or any other type of computing device having the necessary processing hardware to appropriately process data to effectively implement the presently-invented computer-implemented method and system. It will be apparent to one skilled in the relevant art(s) that the system may utilize databases physically located on one or more computers which may or may not be the same as their respective servers. For example, programming software on computer 900 can control a database physically stored on a separate processor of the network or otherwise.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method of preventing loss-leading practices, the method performed on at least one computing device including at least one processor, the method comprising:
   identifying, by a computer system with an automated bot, in communication with a database of products offered for sale, at least one base cost for at least one of the products;
   determining, by the automated bot, at least one current cost for the at least one product from at least one retailer selling the at least one product online or through a mobile sales channel, wherein the current cost is based at least partially on at least one of the following: online or mobile advertisements for the at least one retailer, third-party coupons, third-party websites, third-party rebates, coupons offered by the at least one retailer, discounts offered by the at least one retailer, rebates offered by the at least one retailer, gift card giveaways, or any combination thereof;
   determining, by the automated bot, if the at least one product sold by the at least one retailer is a loss-leader based at least partially on the at least one base cost and the at least one current cost;
   providing an indication that the at least one product sold by the at least one retailer is a loss-leader if the at least one product sold by the at least one retailer is determined to be a loss-leader;
   circumventing at least one human-verification request to provide the appearance of human operation; and
   placing automatically, multiple order requests of the at least one product from the at least one retailer if the at least one product sold by the at least one retailer is determined to be a loss-leader wherein multiple orders are placed for the at least one product, and wherein retailer restrictions on a single product are overcome to purchase inventory of the product at the loss-leading price, wherein the seller is prevented from engaging in predatory and uncompetitive sales practices.

2. The method of claim 1, wherein the step of providing the indication comprises automatically purchasing at least one of the at least one product from the at least one retailer if the at least one product sold by the at least one retailer is determined to be a loss-leader.

3. The method of claim 1, wherein the step of providing the indication comprises providing to at least one user a list including information on the at least one product sold by the at least one retailer if the at least one product sold by the at least one retailer is determined to be a loss-leader.

4. The method of claim 1, wherein the step of providing the indication comprises providing an option to the at least one user to purchase at least one of the at least one product from the at least one retailer if the at least one product sold by the at least one retailer is determined to be a loss-leader, the method further comprising receiving one of a confirmation to purchase at least one of the at least one product and a refusal to purchase at least one of the at least one product from the at least one user.

5. The method of claim 1, wherein the at least one base cost for the at least one product is calculated at least partially based on a purchase price of the at least one product.

6. The method of claim 1, wherein the at least one current cost for the at least one product is determined based at least partially on at least one of the following: online or mobile advertisements for the at least one retailer, third-party coupons, third-party websites, third-party rebates, coupons offered by the at least one retailer selling the at least one product online or through a mobile sales channel, discounts offered by the at least one retailer, rebates offered by the at least one retailer, gift card giveaways, or any combination thereof.

7. The method of claim 1, wherein determining if the at least one product sold by the at least one retailer is a loss-leader is based at least partially on at least one buffer amount, wherein the at least one product sold by the at least one retailer is a loss-leader if the at least one current cost plus the at least one buffer amount is less than the at least one base cost.

8. The method of claim 7, wherein the at least one buffer amount comprises a sum of at least two of the following: cost of shipping, cost of receiving, cost of storing, cost of offering the product for sale, or any combination thereof.

9. The method of claim 1, wherein the at least one base cost is retrieved from at least one database.

10. The method of claim 2, wherein the step of automatically purchasing the at least one product from the at least one retailer comprises automatically filling-in at least one form on a website or mobile interface of the at least one retailer with electronic payment information and shipping information.

11. The method of claim 10, wherein the shipping information comprises a physical address chosen from a plurality of physical shipping addresses.

12. The method of claim 10, wherein multiple orders are placed for the at least one product, and wherein an internet protocol address used to access the website is modified at least once.

13. The method of claim 12, wherein the internet protocol address is modified by spoofing the internet protocol address.

14. The method of claim 7, wherein the shipping information comprises at least one virtual address.

15. The method of claim 10, wherein the shipping information comprises at least one address selected from a plurality of shipping addresses representing a single receiving location.

16. A system for discouraging loss-leading practices, comprising:
- at least one database comprising at least one base cost for at least one product; and
- at least one computer including at least one processor and an automated bot, the bot in communication with the product database, the at least one automated bot configured to:
  - determine at least one current cost for the at least one product from at least one retailer selling the at least one product online or through a mobile sales channel;
  - determine if the at least one product sold by the at least one retailer is a loss-leader based at least partially on the at least one base cost and the at least one current cost;
  - provide an indication that the at least one product sold by the at least one retailer is a loss-leader if the at least one product sold by the at least one retailer is determined to be a loss-leader; and
  - automatically placing at least one order request of the at least one product determined to be a loss-leader,
- wherein the current cost is based at least partially on at least one of the following: online or mobile advertisements for the at least one retailer, third-party coupons, third-party websites, third-party rebates, coupons offered by the at least one retailer, discounts offered by the at least one retailer, rebates offered by the at least one retailer, gift card giveaways, or any combination thereof, and
- wherein the automated bot circumvents detection by at least one human-verification request of a retailer system, and places at least one order request of the at least one product from the at least one retailer if the at least one product sold by the at least one retailer is determined to be a loss-leader.

17. The system of claim 16, wherein the indication is provided by automatically purchasing at least one of the at least one product from the at least one retailer if the at least one product sold by the at least one retailer is determined to be a loss-leader.

18. The system of claim 16, wherein the indication is provided by providing to at least one user a list including information on the at least one product sold by the at least one retailer if the at least one product sold by the at least one retailer is determined to be a loss-leader.

19. The system of claim 16, wherein the indication is provided by providing an option to the at least one user to purchase at least one of the at least one product from the at least one retailer if the at least one product sold by the at least one retailer is determined to be a loss-leader, the method further comprising receiving one of a confirmation to purchase at least one of the at least one product and a refusal to purchase at least one of the at least one product from the at least one user.

20. The system of claim 16, wherein the at least one base cost for the at least one product is calculated at least partially based on a purchase price of the at least one product.

21. The system of claim 16, wherein the at least one current cost for the at least one product is determined based at least partially on at least one of the following: online or mobile advertisements for the at least one retailer, third-party coupons, third-party websites, third-party rebates, coupons offered by the at least one retailer, discounts offered by the at least one retailer, rebates offered by the at least one retailer, or any combination thereof.

22. The system of claim 16, wherein the determination if the at least one retailer is a loss-leader is based at least partially on at least one buffer amount, wherein the at least one retailer is a loss-leader for the at least one product if the at least one current cost plus the at least one buffer amount is less than the at least one base cost.

23. The system of claim 22, wherein the at least one buffer amount comprises the sum of at least two of the following: cost of shipping, cost of receiving, cost of storing, cost of offering the product for sale, or any combination thereof.

24. The system of claim 16, wherein the at least one base cost is retrieved from at least one database.

25. The system of claim 17, wherein automatic purchase of the at least one product from the at least one retailer comprises automatically filling-in at least one form on a website or mobile interface of the at least one retailer with electronic payment information and shipping information.

26. The system of claim 25, wherein the shipping information comprises a physical address chosen from a plurality of physical shipping addresses.

27. The system of claim 25, wherein multiple orders are placed for the at least one product, and wherein an internet protocol address used to access the website is modified at least once.

28. The system of claim 27, wherein the internet protocol address is modified by spoofing the internet protocol address.

29. The system of claim 25, wherein the shipping information comprises at least one virtual address.

30. The system of claim 25, wherein the shipping information comprises at least one address selected from a plurality of shipping addresses representing a single receiving location.

* * * * *